March 21, 1961 A. C. STOFFERT 2,975,864
FLUID LUBRICATION SYSTEM
Filed May 25, 1959
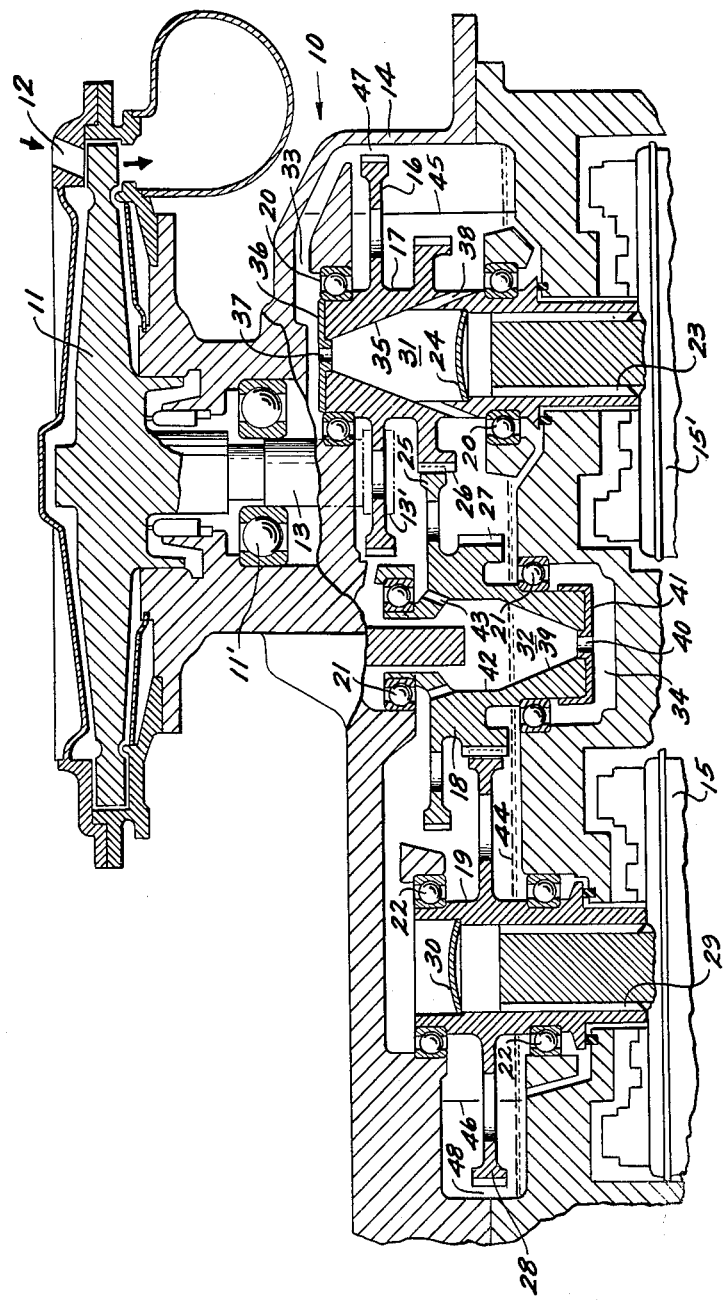
INVENTOR.
ARNOLD C. STOFFERT
BY
ATTORNEY—

United States Patent Office 2,975,864
Patented Mar. 21, 1961

2,975,864

FLUID LUBRICATION SYSTEM

Arnold Charles Stoffert, Reading, Mass., assignor to General Electric Company, a corporation of New York Filed May 25, 1959, Ser. No. 815,701

5 Claims. (Cl. 184—6)

My invention relates to lubrication systems for gear and bearing mechanisms, and has particular application to systems of the foregoing type which are to operate in a variety of attitudes or positions, such as would occur for instance in aircraft or missile applications.

As is well known in the art, it is common practice to employ a fluid lubrication system in bearing and gear mechanisms. Generally such systems require some type of fluid circulating arrangement in order to insure that the lubricant is delivered to the various areas requiring lubrication. A typical circulating system may comprise, for instance, a splash type lubrication arrangement wherein the fluid is delivered to the points requiring lubrication through agitation by direct contact with one or more rotating gears. Various types of positive pumping systems are also commonly used for lubrication fluid distribution purposes.

In some applications, such as in missile or aircraft installations, it is necessary for bearing and gear arrangements to operate over a wide range of attitudes. One of the problems encountered in fluid type lubrication systems in such applications is that of insuring continuous fluid distribution throughout the full range of possible flight attitudes. It will be recognized, for instance, that in the splash type lubrication system with one or more gears arranged to contact the fluid when it is located in one portion of the gearbox or casing with the casing in a so called normal position, continued distribution of fluid would not necessarily be insured with the casing in various other attitudes, since the fluid may move out of contact with the gears, or in the case of the pump system, may move away from the pump inlet.

In view of the foregoing, it is an object of my invention to provide an improved fluid lubrication system for bearing and gear mechanisms which provides continuous fluid distribution throughout the full range of operating attitudes.

Briefly stated, I accomplish this and other objects of my invention in one embodiment thereof by the provision of a fluid lubrication system wherein fluid distribution is initiated in the normal and inverted positions by a pair of oppositely disposed cone type pumps formed integrally with the gearing, and in the side positions by a splash system. Thus, with the gear system in a position in which the plane of rotation of the gears is substantially parallel to the surface of the lubricating fluid stored in the gearbox fluid, distribution is initiated by one of the two oppositely disposed cone pumps, whereas with the system in a position in which the fluid surface is perpendicular to the plane of rotation of the gears, the clearances between the gears and the casing are such that splash initiated distribution is accomplished. Distribution of lubricating fluid in immediate positions is accomplished by combinations of the two modes just described.

My invention will be better understood and the other objects and advantages thereof will become apparent from the following description taken in connection with the accompanying drawings in which:

The single figure is an elevational view taken partly in cross-section of a turbine driven auxiliary power unit having a gear reduction mechanism embodying my invention.

Referring now to the drawing, there is shown an auxiliary power unit 10 of the type which may be used to drive accessories such as hydraulic pumps, generators and the like in missile and aircraft applications. The unit is driven by a turbine 11 which derives its power from a source of motive fluid, such as hot gas and the like, delivered to the turbine through one or more inlet nozzles 12. Power is taken off the turbine from its output shaft 13, which extends into a gearbox 14 for speed reduction purposes, the power eventually being delivered to a pair of output pads 15 and 15a to which the driven accessories are connected. The turbine output shaft 13 is provided with a pinion 13' which meshes with an input gear 16 on gear member 17. Because of the particular section through the gearbox chosen for illustration purposes, the mesh between the turbine output pinion 13' and the gear 16 is shown in phantom. The turbine is rotatably mounted in a pair of bearings, one of which is shown at 11'.

The gearbox illustrated comprises three gear members 17, 18 and 19, each rotatably mounted in a set of bearings 20, 21 and 22 respectively. As set forth above, the input to the system meshes with the input gear 16 to provide one stage of speed reduction. The gear member 17 is provided with an internal spline 23 which provides a driving connection for an externally splined input member of an accessory such as a pump or a generator, mounted on the accessory pad 15a. The output is sealed by means of a sealing plate 24 mounted at the end of the aperture in which the spline 23 is located.

Reduction to a still lower speed is provided by intermediate gear member 18 which includes a gear element 25 meshing with gear element 26 on the gear member 17. A further reduction from the intermediate speed to a second output speed is provided by meshing gear elements 27 and 28 mounted on gear members 18 and 19 respectively. Gear member 19 is provided with an output spline 29 which forms the output connection for the accessory pad 15, the output being sealed by means of a plate 30 as shown.

Referring now to the fluid lubrication system embodied in the gear and mechanism shown, I provide a pair of oppositely disposed cone pumps 31 and 32, which are formed integrally with the gear members 17 and 18 respectively. These pumps are disposed to pump lubricating fluid in a direction generally transverse to the plane of operation of the gears, or in other words, to impart to the fluid a component of velocity in a direction parallel to the axes of rotation of the gears.

The cone pump 31 is positioned to pump fluid from a space 33 located at the top of the gearbox, the system being assumed to be in its normal operating position as illustrated, while the pump 32 is positioned to pump fluid from a space 34 located at the bottom of the gearbox. The pump 31 comprises an internal cavity formed of a frusto-conically shaped wall 35 having an axis substantially coincident with the axis of rotation of the gear member 17. The fluid inlet to the pump 31 is formed by an end plate 36 having an orifice 37 located therein. The diameter of the frusto-conical cavity increases with increasing longitudinal distance away from the inlet opening 37. Located near the opposite end of the cavity 35 from the inlet opening 37, is a series of openings 38 extending through the gear member 17 and forming passageways generally directed at the adjacent bearing 20 as shown.

Pump 32 is similarly formed in that it comprises an inner cavity formed in the gear member 18 of frusto-conically shaped walls 39 increasing in diameter away from an inlet opening 40 formed in an end plate 41. In the configuration of pump 32, the conically shaped walls 39 extend into a straight cylindrical cavity portion 42 and a series of apertures 43 extend through the gear member 18 and into the cavity 42, the apertures 43 forming passages generally directed at the upper bearing 21 as shown.

Lubrication for the bearings and the gear meshes is supplied from a reservoir of lubricating fluids stored within the gear casing 14. With the unit in the position shown, that is with the pads 15 and 15a on the lower side of the unit and the turbine 11 on the upper side, the lubricating fluid fills the lower cavities of the gearbox 14, forming a liquid level surface extending horizontally across the casing as represented by the numeral 44. Under these conditions, the inlet 40 of the pump 32 is in fluid communication with the lubricating fluid and acts to initiate the circulation of the fluid throughout the bearing and gear mechanism.

Lubrication fluid entering the pump inlet 40 and coming into contact with the adjacent conically shaped wall 39 is accelerated and given an angular velocity component through frictional contact with the rotating wall. This produces a radial component of force on the fluid which in turn, by reason of the conical wall, is given a component generally parallel to the axis of rotation of the gear member and away from the inlet 40. Thus, the fluid entering the pump at the inlet 40 travels along the wall 39 away from the inlet and in the direction of the discharge ports 43. The fluid then passes through the cylindrical chamber 42 and into the discharge ports 43 where it is directed at the upper bearing 21 as shown.

The passages 43 are tilted somewhat in the radial direction so that the fluid is also given a radial velocity component as it is directed against the bearing 21, so that as it strikes the bearing it is broken into radially directed particles or droplets, some of these being in the form of a spray or mist, for further distribution throughout the gear casing. These fluid particles are deflected radially outwardly throughout the gear casing where they are picked up and further distributed by the rotating gear elements 17 and 19, this portion of the subsequent distribution taking place in much the same manner as is the case with a typical splash system. The distribution of the fluid particles is further implemented by the operation of the cone pump 31 in that lubricating mist, including particles and droplets suspended in the mist, is drawn into the pump inlet 37, given axial and radial velocity components, and discharged against the lower bearing 20 through the discharge ports 38. The ports 38 are also inclined in the radial direction so that the radial component of velocity imparted by the pump is preserved as the fluid is discharged.

It will be apparent that the fluid is distributed in the same manner as that just described for a range of operating attitudes in the general vicinity of the one assumed for purposes of description, it being required only that the net distribution of the fluid within the casing be such that it remains in fluid communication with the inlet 40 of the pump 32.

With the gearbox operating in a position inverted from that shown, the fluid occupies the upper portion of the gearbox and fills the cavity 33 such that it is in fluid communication with the inlet 37 of the pump 31. Under these conditions, distribution of the fluid throughout the system is initiated by the pump 31. Fluid enters the pump at the inlet 37, travels along the conically shaped wall 35, and is discharged against the lower bearing 20 with both radial and axial velocity components. Upon striking the bearing the fluid is broken into particles and droplets and deflected radially outwardly for further distribution throughout the system, the pump 32 serving to facilitate this distribution by pumping lubricating vapor and droplets through the discharge ports 43. As is the case with the normal operating position, fluid distribution in the inverted position will be accomplished in the same manner as that just described for a range of positions about the inverted one, so long as the lubricating fluid remains in communication with the pump inlet 37.

For operation of the system in a side position, that is with the lubricating fluid located at one end of the gearbox and forming a fluid surface such as represented at 45 or 46, distribution of the fluid is initiated by utilizing the splash principle, that is by direct agitation of the fluid through contact with one or more rotating gear surfaces. With the fluid at the right-hand end of the gearbox so as to form the fluid surface 45, the fluid is picked up by the gear element 16 and given a velocity component generally tangential to the pitch line of the gear. Once the fluid is put into motion in this manner, it strikes the various stationary and rotating surfaces in the gearbox and is further broken up into spray and droplets and is thus distributed throughout the system. The same type of distribution occurs with the fluid forming the surface 46, the initial velocity in this case being imparted by the gear element 28. Under these conditions, both of the pumps 31 and 32 pump lubricant in vapor and droplet form to facilitate distribution throughout the system. The clearances 47 and 48 between the gear 16 and 28 respectively and the casing 14 are such, relative to the amount of fluid stored in the casing and the configuration employed, that these elements can operate to provide splash initiated distribution over a range of attitudes about those described. It will be seen that for various intermediate operating attitudes, fluid distribution may be initiated at the same time by both a pump and one of the gear elements.

It will be appreciated from the foregoing, that the arrangement of my invention thus provides a fluid lubricating system for bearing and gear mechanisms which is virtually attitude free, in that fluid distribution in directions generally transverse to the axes of rotation of the gear elements is initiated by a splash method, while fluid distribution and directions generally parallel to axes of rotation to the gear elements is initiated by a pair of oppositely disposed cone type pumps formed integrally with two of the gear elements.

Although it will be appreciated that my invention is particularly applicable to gear and bearing mechanisms of the general type shown in which two or more of the gear elements are mounted to rotate on parallel axes, as opposed to systems using right angle reductions and the like, it is to be understood that my invention may be applied to arrangements other than the particular one shown without departing from the true scope and spirit thereof as defined in the appended claims.

What I claim as new and desire to secure by Letters Patent is:

1. In a gear and bearing mechanism including a pair of gear members mounted on substantially parallel rotational axes in a gear casing, a lubrication system comprising a tapered cavity in one of said gear members tapering down toward an inlet opening near one end thereof, a tapered cavity in the other of said gear members tapering down in an opposite direction from said first mentioned cavity toward an inlet opening near one end thereof such that the inlet openings to said tapered cavities are oppositely disposed in said gear members and in said casing, and discharge ports extending into said cavities near the ends thereof opposite from said inlet openings, said discharge ports being positioned to discharge lubricating fluid from said cavities into the interior of said gear casing to facilitate distribution of lubricating fluid within said casing, said gear casing being shaped such that a supply of lubricating fluid stored within the casing is brought into communication with one of said inlet openings over a first range of operating attitudes and into communication with the other of said inlet openings over a second range of operating attitudes.

2. A lubrication system as set forth in claim 1 wherein said discharge ports are positioned to direct fluid discharged therefrom in a direction having both radial and axial velocity components to facilitate distribution of the fluid through said casing.

3. In a gear and bearing mechanism including a pair of gear members each mounted in at least one bearing on substantially parallel rotational axes in a gear casing, a lubrication system comprising a tapered cavity in one of said gear members tapering down toward an inlet opening near one end thereof, a tapered cavity in the other of said gear members tapering down in an opposite direction from said first mentioned cavity toward an inlet opening in one end thereof such that the inlet openings to said tapered cavities are oppositely disposed in said gear members and in said casing, said gear casing being shaped such that a supply of lubricating fluid stored within the casing is brought into communication with one of said inlet openings over a first range of operating attitudes and into communication with the other of said inlet openings over a second range of operating attitudes, and discharge ports extending through said gear members and into said cavities near the ends thereof opposite from said inlet openings, said discharge ports being positioned to direct fluid discharged therefrom against at least one of the supporting bearings of each of said gear members, whereby the fluid is deflected from said bearings in droplet form to facilitate further distribution of the fluid throughout the interior of the gear casing.

4. In a gear and bearing mechanism including a plurality of gear members mounted on substantially parallel rotational axes in a gear casing, a lubrication arrangement comprising a tapered cavity in one of said gear members tapering down toward an inlet opening near one end thereof, a tapered cavity in another of said gear members tapering down in an opposite direction from said first mentioned cavity toward an inlet opening in one end thereof such that the inlet openings to said cavities are oppositely disposed in said gear members and in said casing, said casing being shaped such that a supply of lubricating fluid stored in the casing is brought into communication with one of said inlet openings over a first range of operating attitudes and into communication with the other of said inlet openings over a second range of operating attitudes, discharge ports extending through said gear members and into said cavities near the ends thereof opposite from said inlet openings, said discharge ports being positioned to discharge lubricating fluid from said cavities into the interior of said gear casing to facilitate distribution of lubricating fluid within said casing, and a radially extending portion on at least one of said plurality of gear members positioned such that the outer periphery of its rotative path extends adjacent the inner surface of said gear casing, said casing being shaped in the vicinity of the peripheral path of said radially extending portion such that lubricating fluid stored in the casing is picked up and put into motion in the casing over a third range of operating attitudes by rotative movement of said radially extending portion.

5. A lubrication arrangement as set forth in claim 4 including a second radially extending portion on another of said plurality of gear elements positioned oppositely in said casing from said first radially extending portion and positioned such that the outer periphery of its rotative path extends adjacent the inner surface of said casing, said casing being shaped such that over a fourth range of operating attitudes lubricating fluid stored therein is picked up and put into motion by rotative movement of said second radially extending portion.

References Cited in the file of this patent

UNITED STATES PATENTS

| | | |
|---|---|---|
| 2,256,754 | Schmitter et al. | Sept. 23, 1941 |
| 2,312,596 | Smith | Mar. 2, 1943 |